Figure 1:
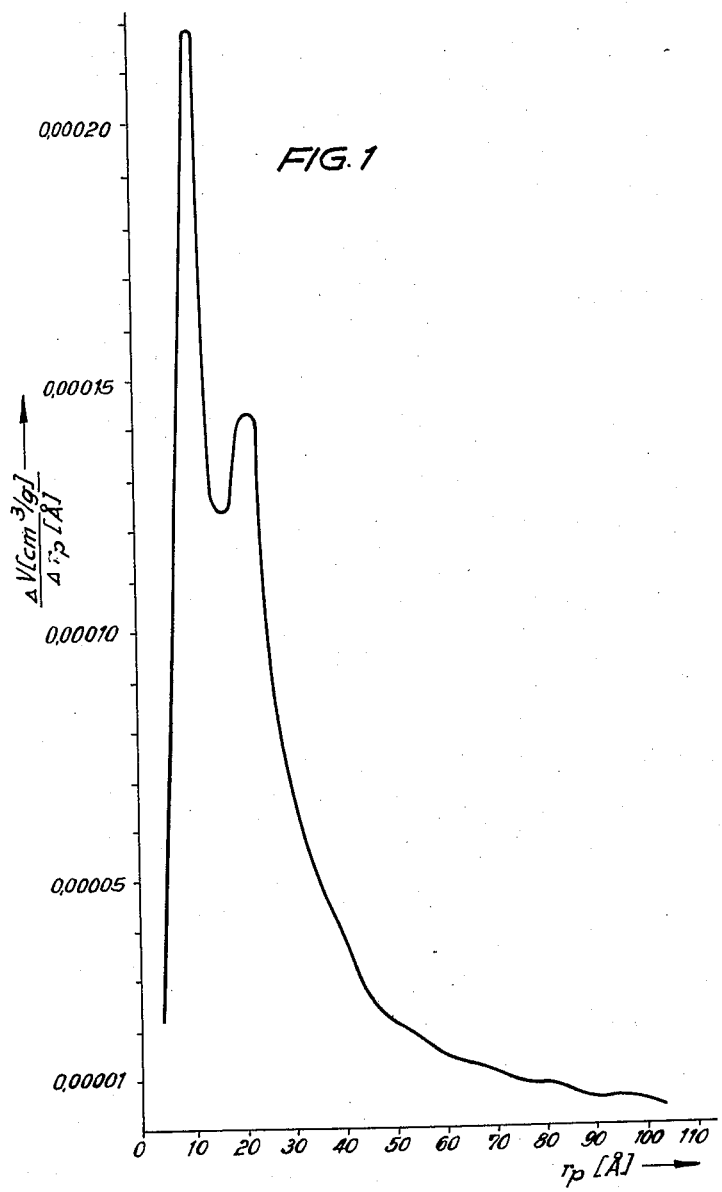

Nov. 10, 1959  E. JUSTI ET AL  2,912,478
FUEL CELLS

Filed Nov. 30, 1954  2 Sheets-Sheet 2

INVENTORS
EDUARD JUSTI
HANS-JOACHIM THUY
AUGUST WINSEL
BY Burgess and Dinklage
ATTORNEYS

United States Patent Office 2,912,478
Patented Nov. 10, 1959

2,912,478

FUEL CELLS

Eduard Justi,, Braunschweig, Hans Joachim Thuy, Ulm (Danube), and August Winsel, Braunschweig, Germany, assignors to Ruhrchemie Aktiengesellschaft, Oberhausen-Holten, Germany, and Steinkohlen-Elektrizitat Aktiengesellschaft, Essen-Ruhr, Germany, both corporations of Germany Application November 30, 1954, Serial No. 472,084

Claims priority, application Germany December 4, 1953

19 Claims. (Cl. 136—86)

This invention relates to improvements in fuel cells for the direct conversion of chemical energy of combustible gases into electrical energy. The invention more particularly relates to an improved electrode for a fuel call and a process for making the same.

In all galvanic cells it is desirable to use electrodes which exhibit as high as possible a current density with very little polarization. This is particularly true in connection with fuel cells which are generally intended for use in larger power generation plants. Due to economic considerations and particularly with respect to the initial investment costs, it is desirable to obtain as high a capacity as possible per unit volume of the cell since the initial cost of the cell may be considered proportional to its volume. Thus, for example, a battery of cells of a power station of 10,000 kilowatts capacity, taking into consideration the wall thickness of the electrodes required, the electrolyte space, and assuming the most favorable terminal voltage of about 0.9 volt per cell, would require a volume of 3,300 cubic meters if the electrodes had a current density of about 10 ma./sq. cm. If the electrodes, however, had a current density of about ten times this amount, a total volume of only about 330 cubic meters would be required.

Oxygen electrodes for fuel cells having higher current densities have often been suggested in the literature of the art. For example, Kordesch and Marko, in "Oesterreichische Chemikerzeitung," vol. 52, page 125 (1951), describe oxygen electrodes which are prepared by soaking with various metal salt combinations and subsequent oxidation. (See also Marko and Kordesch, Austrian Patent 168,040, (1950) and Austrian Patent 167,840 (1950).

An oxygen electrode of a different type is described by R. G. H. Watson, "Direct Current," September 1952, pages 30–34. This electrode, in short circuit, reaches a maximum current density of 650 ma./sq. cm. at a temperature of 230° C. The electrode consists of a porous nickel produced by a special process. A substantial disadvantage of this electrode however resides in the fact that it is strongly attacked by the electrolyte which is an approximately 30-normal potash solution, and thus has only a very limited life. A further disadvantage of this electrode is that the value given above for the current density is not obtained until a temperature of 230° C. is reached, which requires that the total pressure in the plant amounts to 28 atmospheres.

Figure 2:
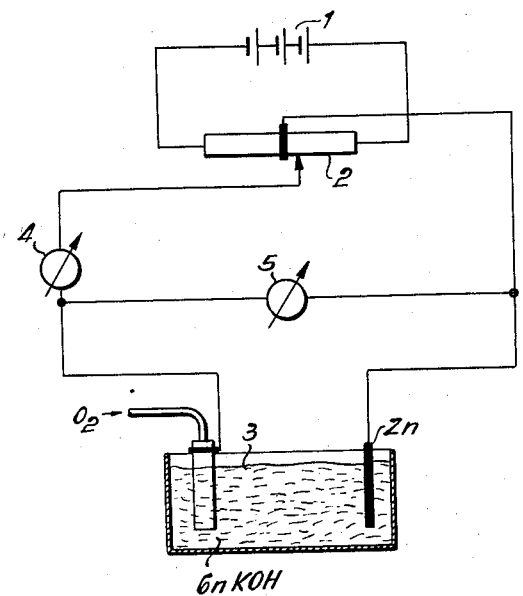
Figure 3:
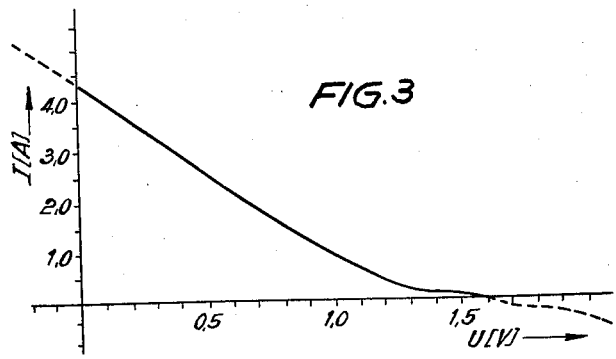

One object of this invention is an electrode for a fuel cell utilizing the chemical energy of combustible gases such as hydrogen, methane, carbon monoxide, and mixtures thereof, which has a high current density at a relatively low temperature. This, and still further objects will become apparent from the description which follows, read in conjunction with the drawings in which:

Fig. 1 is a graph showing the relationship of the distribution of the pore radii throughout the pore volume of a carbon electrode;

Fig. 2 diagrammatically shows an arrangement for ascertaining the properties of an oxygen electrode;

Fig. 3 is a current voltage graph plotted with the arrangement shown in Fig. 2.

The electrode in accordance with the invention comprises a suitably shaped gas and preferably oxygen electrode of carbon which has an average pore diameter of 10 to 100 and preferably 10 to 40 Angstrom units and an inner surface area of 10 to 50 and preferably 10 to 30 square meters per gram.

The gas and preferably oxygen electrode has been found to be particularly well suited for use in a fuel cell for the direct electro-chemical conversion of the chemical energy of combustible gases such as hydrogen, methane, carbon monoxide, or mixtures thereof into electrical energy.

The carbon electrode, in accordance with the invention, has a current density in short circuit of about 400 ma./cm.$^2$ at room temperature and 1000 ma./cm.$^2$ at about 80° C.

The electrode in accordance with the invention, may be prepared by suddenly heating a shaped carbon body to a temperature of above 650° C., preferably 700 to 1000° C. and subsequently suddenly chilling to a temperature below 50° C. with one or several repetitions of this procedure.

Thus, an electrode, in accordance with the invention, must be prepared from, for example, a tubular carbon shaped body, by rapidly heating the carbon tube in an electric furnace and preferably in an induction furnace to a temperature of about 700 to 1000° C. and subsequently suddenly chilling the electrode by quenching in cold water. (The term rapidly as used above means a period of time of less than one minute, preferably less than 10 seconds and best less than 5 seconds.) The carbon tube which is soaked with water is then heated again and by the sudden heating, the water contained in the tube is blown out in the form of small steam jets. Thereafter, the procedure described above may be repeated two or three times. After this treatment, the surface of the electrode which has previously been smooth is roughened and the entire carbon tube is highly porous having the average pore diameter and inner surface area indicated above.

For the production of the carbon body, a carbon which is commercially produced for electrochemical processes has been found suitable. This is a carbon which, in the course of its production, is subjected to working processes which remove the impurities of the carbon substance to such an extent that use for the usual electrochemical purposes is possible. The process, however, is not limited to this type of carbon.

At the first glance, the procedure described above may appear to have a certain similarity to the known "Norit" process for the production of activated carbon, In fact, however, an entirely different phenomenon is involved in the production of the carbon electrode in accordance with the invention and the production of active carbon in accordance with the Norit process. In the Norit process a previously charred material, such as charcoal, peat coke, etc. is heated in a suitable furnace to a temperature of 800 to 1000° C. During the heating, water vapor is passed into the furnace. This water vapor slowly activates the carbon with the formation of water gas. (See, for example, Dr. G. Bailleul, Dr. W. Herbert, Dr. E. Reisemann "Aktive Kohle und ihre Verwendung in der chemischen Industrie," 1937, page 5.) Thus, as may be seen, in the Norit process, the steam activation is based on a purely chemical conversion in the carbon, while in the process of the invention, the activation is preferably brought about by the outburst of the water vapor as described above and by the abrupt temperature change.

The difference in structure of the porous electrode produced in accordance with the invention and activated carbon produced, for example, in accordance with the Norit process, may be illustrated by treating a carbon body such as a coal, in accordance with the process of the invention as described above, and by treating a similar body in accordance with the above described Norit process. The difference in the characteristics of the two bodies after the treatment is shown in the following table:

|  | Carbon Treated in accordance with the Invention | Activated Carbon, Norit Process |
| --- | --- | --- |
| Grain volume _____(cm.³/gm.)__ | 0.637 | 1.26 |
| Structure volume _____(cm.³/gm.)__ | 0.506 | 0.49 |
| Pore volume _____(cm.³/gm.)__ | 0.131 | 0.77 |
| Porosity _____percent__ | 20.6 | 61 |
| Inner surface area _____(m.²/gm.)__ | 16.8 | 792 |

In the table, the grain volume referred to, in accordance with the usual terminology, is the specific volume of the entire carbon body including the pore volume. The structure volume designates the specific volume of only the carbon structure. (The reciprocal value of the structure volume, therefore, is equal to the density of the carbon including the pore space which is not accessible from the outside.) The pore volume is understood to be the volume of the pores which are accessible from the outside. The porosity is the ratio of pore volume to grain volume. The inner surface area may be determined from the absorption isotherm by the so-called Brunnauer-Emmet-Teller process (BET method). (See, for example, G. M. Schwab, "Handbuch der Katalyse," vol. 4, page 195.)

One of the essential features of a gas electrode to be used for electrochemical purposes is the number and the size of the pores contained therein. As is already known, the pore diameter of porous bodies is never a uniform one. Accordingly, it is of importance for the characterization of the pore system of a gas electrode to know the distribution of the pore volume to the different pore diameters. Figure 1 shows the distribution curve of the pore volume. On the abscissa, the pore radius is plotted in Angstroem units and the ordinate shows the pore volume per Angstroem unit, measured in (cm.³/gm.). The distribution curve was established by plotting a nitrogen isotherm and by subsequent interpretation by a process described by P. Barrett, L. G. Joyner and P. P. Halenda (Ind. Eng. Chemistry, 43, 373 (1951)). As may be seen, the curve shows a marked maximum at about 12 Angstroem units and another lower one at about 22 Angstroem units.

For use as oxygen electrode, a carbon tube prepared by the process described above is sealed at one end with a carbon stopper or a metal contact. The other end of the carbon tube is provided with a connecting piece through which oxygen or air can be admitted under a pressure of 1 to 2 atmospheres gauge. The oxygen pressure must be sufficient to prevent the liquid electrolyte from entering the pores.

The invention, of course, is not limited to tubular carbon bodies and plain electrodes will rather be used for technical purposes. Such plain electrode shapes are, for example, used in the bipolar cells of the alkali chloride electrolysis.

To ascertain the properties of the oxygen electrode as compared with a reference electrode of sufficient constancy and yield, the former was combined with a zinc electrode of large surface to form a galvanic cell. A 6-normal potash solution was used as the electrolyte. The current density at the oxygen electrode was determined from the surface area of the same and from the amperage under various loads.

A galvanic cell, from the point of view of electrotechniques, is an active dipole, the behavior of which is determined by the values of no-load voltage=E.M.F. ($I=0$), short-circuit current (at the terminal voltage $U=0$) and the internal resistance, $R_i$. These data are most conveniently taken from the current voltage characteristic which, for example, may be plotted with the arrangement as shown in Fig. 2. In order to be able with the unavoidable resistances of the lead wires to actually obtain the short circuit current, i.e. the terminal voltage $U=0$, an auxiliary circuit is provided which consists of the auxiliary voltage source 1 and a variable voltage divider 2 with the center tap. The $O_2$ electrode of the cell 3 is connected via the amperemeter 4 to the slide of the voltage divider 2. The Zn electrode is connected to the center tap of the voltage divider 2. The terminal voltage, U, of the cell is measured by means of a high-ohmic voltmeter 5. This wiring permits the following of the current voltage curve so far that an exact determination of the characteristic values, short circuit amperage and no-load voltage, is possible from the intersections of the characteristic curve with the ordinate or abscissa of the current voltage graph shown in Fig. 3. As may be seen from Fig. 3, the current voltage curve is approximately straight-line in the range from $U=0$ to about $U=1.3$ v. A noticeable polarization, therefore, does not take place even with higher current densities. The break of the curve at about 1.3 volts is based on the following: Two reactions are of importance for the current-furnishing process, the oxygen supplied is either converted into hydrogen peroxide, which corresponds to the shape of the curve in the voltage range of 0 to about 1.3 volts, or there occurs a formation of water, to which process the flatter branch of the curve as well as the measured E.M.F. of 1.56 volts may be attributed.

Together with the statements on the current density obtainable at the carbon electrodes, data on the current density as dependent upon the voltage are given. These data permit the designer of a cell to use such carbon electrodes treated in accordance with the invention, and the particular shape to be chosen and the particular most favorable load, respectively, result from the external conditions which are different in each case.

The carbon electrode described above with a special view to use in fuel cells is suited, according to its nature, in the same manner for use as oxygen electrode in the known atmospheric oxygen-zinc cells as generally known for flashlights and similar purposes.

It is of particular advantage with respect to the rapid heating to operate in such a manner that the carbon electrode is connected to a low voltage and high productiveness source of current so that a sudden heating by current heat occurs in the electrode serving as the resistance—a principle used in the so-called "Tamman" furnace.

We claim:
1. A gas electrode comprising a shaped, porous carbon body, having a pore diameter substantially within the range of 10–100 Angstrom units and an inner surface area of 10–50 square meters per gram which has been prepared by rapidly heating a shaped carbon electrode body to a temperature of about 650° C., rapidly chilling the body to a temperature below 50° C. within a period up to one minute and repeating the heating and chilling at least one additional time.

2. Electrode according to claim 1, having a pore diameter substantially within the range of 10–40 Angstrom units.

3. Electrode according to claim 1, having an inner surface area of 10–30 square meters per gram.

4. Gas electrode according to claim 1, in which said shaped body is a hollow, tubular-shaped body.

5. In a fuel cell for the direct electrochemical conversion of the chemical energy of combustible gases such as hydrogen, methane, carbon monoxide and mixtures thereof into electrical energy, the improvement which comprises the gas electrode comprising a shaped, porous carbon body, having a pore diameter substantially within the range of 10–100 Angstrom units and an inner surface area of 10–50 square meters per gram which has been prepared by rapidly heating a shaped carbon electrode body to a temperature of above 650° C., rapidly chilling the body to a temperature below 50° C. within a period up to one minute and repeating the heating and chilling at least one additional time.

6. Improvement according to claim 5, in which said pore diameter is substantially within the range of 10–40 Angstrom units.

7. Improvement according to claim 5, in which said inner surface area is 10–30 square meters per gram.

8. Improvement according to claim 5, in which said shaped body is a hollow, tubular body.

9. Improvement according to claim 5, in which said gas electrode is an oxygen electrode.

10. Process for the production of gas electrodes which comprises rapidly heating a shaped carbon electrode body to a temperature of above 650° C., suddenly cooling the body to a temperature below 50° C. within a period up to one minute, and repeating the heating and cooling at least one additional time.

11. Process according to claim 10, in which at least said first sudden cooling is by water quenching.

12. Process according to claim 10, in which said heating is effected to a temperature of about 700–1000° C.

13. Process according to claim 12, in which the said first sudden cooling is effected by water quenching.

14. Process according to claim 10, in which said heating is effected in an induction furnace.

15. In the process for the direct electrochemical conversion of the chemical energy of combustible gases selected from the group consisting of hydrogen, methane, carbon monoxide and mixtures thereof into electrical energy with the use of a fuel cell, in which the electrochemical reaction zone is maintained at a temperature between 20° and 80° C. the improvement which comprises using as the gas electrode for the fuel cell a porous, shaped carbon electrode having a pore diameter substantially within the range of 10–100 Angstrom units and an inner surface of 10–50 square meters per gram which has been prepared by rapidly heating a shaped carbon electrode body to a temperature of above 650° C., rapidly chilling the body to a temperature below 50° C. within a period up to one minute and repeating the heating and chilling at least one additional time.

16. Improvement according to claim 15, in which the electrode has a pore diameter substantially within the range of 10–40 Angstrom units.

17. Improvement according to claim 15, in which said carbon electrode has an inner surface area of 10–30 square meters per gram.

18. Improvement according to claim 15, in which said gas electrode is an oxygen electrode.

19. Process according to claim 10, in which said heating is effected in such a manner that current heat is generated in the carbon electrode in the manner of a Tamman furnace.

References Cited in the file of this patent

UNITED STATES PATENTS

| | | |
|---|---|---|
| 431,968 | Goodwin | July 8, 1890 |
| 677,226 | Jone | June 25, 1901 |
| 2,364,536 | Kent | Aug. 13, 1943 |
| 2,570,543 | Gorin | Oct. 9, 1951 |

FOREIGN PATENTS

| | | |
|---|---|---|
| 164,457 | Australia | Aug. 4, 1955 |